United States Patent
Itoh et al.

(10) Patent No.: US 6,353,543 B2
(45) Date of Patent: Mar. 5, 2002

(54) SWITCHING CIRCUIT OF POWER CONVERSION APPARATUS

(75) Inventors: Kazuyuki Itoh; Yoshihisa Okita; Katsuaki Tanaka, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/858,341

(22) Filed: May 14, 2001

Related U.S. Application Data (63) Continuation of application No. PCT/JP00/06253, filed on Sep. 13, 2000.

(30) Foreign Application Priority Data

Sep. 16, 1999 (JP) .......................................... 11-261509

(51) Int. Cl.$^7$ ............................................. H02M 3/335
(52) U.S. Cl. ................................... 363/21.01; 363/131
(58) Field of Search ........................ 363/16, 20, 21.01, 363/21.02, 21.04, 21.12, 131

(56) References Cited

U.S. PATENT DOCUMENTS

| | | | |
|---|---|---|---|
| 3,925,717 A | * 12/1975 | Kinnard ........................ | 363/21 |
| 4,274,135 A | 6/1981 | Rosa et al. | |
| 4,420,804 A | * 12/1983 | Nishino ........................ | 363/21 |
| 4,652,809 A | * 3/1987 | Barn ............................. | 323/282 |
| 5,021,936 A | 6/1991 | Nishizawa et al. | |
| 5,113,127 A | * 5/1992 | Hoffman et al. ............... | 320/21 |
| 5,471,376 A | * 11/1995 | Tsai et al. ..................... | 363/20 |
| 5,917,712 A | * 6/1999 | Okura et al. .................. | 363/19 |
| 6,078,508 A | * 6/2000 | Okamura et al. .............. | 363/19 |
| 6,108,217 A | * 8/2000 | Tran ............................. | 363/20 |

FOREIGN PATENT DOCUMENTS

JP        1-97173        4/1989

OTHER PUBLICATIONS

"Development of a High Efficiency Inverter without Audible Noise", Takahashi, et al., T.IEE Japan, vol. 116–D, No. 12, 1996, pp. 1205–1210.
"How to Get 99% Inverter Efficiency", Takahashi, et al., 0-7803-1993-1/94 IEEE 1994, pp. 971–976.
"Silent High Efficiency Inverter", Itoh et al., (1995).

* cited by examiner

*Primary Examiner*—Adolf Deneke Berhane
(74) *Attorney, Agent, or Firm*—Frishauf, Holtz, Goodman, Langer & Chick, P.C.

(57) ABSTRACT

A switching circuit for a power conversion apparatus capable of reducing conduction loss to provide a higher efficiency, and achieving downsizing and weight-reduction and higher driving frequency based on the improved efficiency is disclosed. A driving transistor is connected to a switching main transistor to supply a driving power for ON-OFF driving thereto, and an auxiliary power source composed of a current transformer is provided between the main transistor and the driving transistor. An auxiliary transistor having a lower switching loss than that of the main transistor is connected in parallel with the main transistor to form a main switch in combination with the main transistor. A current-driven type transistor serves as the main transistor, and voltage-driven type transistors serve as both of the driving transistor and the auxiliary transistor. The auxiliary transistor is adapted to be driven at a higher speed than that of the main transistor when the main transistor is turned on, and adapted to be driven at a lower speed than that of the main transistor when the main transistor is turned off.

6 Claims, 5 Drawing Sheets

SWITCHING CIRCUIT OF POWER CONVERSION APPARATUS

This application is a Continuation patent application of International Application PCT/JP00/06253 (not published in English), filed on Sep. 13, 2000.

TECHNICAL FIELD

The present invention relates to a switching circuit of a switching type power conversion apparatus. In particular, the present invention relates to a type of switching circuit in which a driving transistor is connected to a switching main transistor to supply a driving power for ON-OFF driving thereto in response to a control signal, and an auxiliary power source is provided between the main transistor and the driving transistor.

BACKGROUND ART

In view of efficient utilization of energy, a power conversion apparatus using a semiconductor switching element or switching transistor has an extremely widespread availability due to its excellent characteristics in power conversion efficiency. The semiconductor switching transistor includes a voltage-driven type transistor, such as an isolated-gate bipolar transistor (IGBT), static-induction transistor (SIT) and field-effect transistor (FET), and a current-driven type transistor, such as a bipolar-mode static-induction transistor (BSIT) and bipolar junction transistor (BJT).

The voltage driven type transistor may be directly driven by a voltage signal so that a driving circuit may be readily simplified and its driving frequency may also be arranged higher. In applications requiring a withstand voltage of 250V or more, several types of switching transistors are selectively used depending on requirements for capacity and driving frequency. Specifically, in case of using the switching transistors in a driving frequency range of several KHz to several hundred KHz, the IGBT excellent in overall balance of voltage drop in ON state and switching performance and the FEA having small current capacity but capable of high speed operation are widely employed in the power conversion apparatus.

On the other hand, since the current-driven switching type transistor is driven by applying current to a control terminal, a driving circuit tends to be complexified and to have a lower operation speed than that of the voltage-driven type transistor. However, the current-driven type switching transistor has an advantageous feature that the voltage drop in ON state is about one-third to one-sixth of that of the voltage-driven type transistor, and thereby provides a lower conduction loss. This proves that the current-driven type switching transistor is more suitable for providing a downsized power conversion apparatus.

While there are broadly classified two types of semiconductor switching elements or switching transistor available for the power conversion apparatus, as described above, it has been often the case that the voltage-driven type switching transistor having a low switching loss and facilitating a high frequency driving was employed in view of downsizing of components, simplification of circuits, downsizing based on high driving frequency, cost reduction and other. However, considering how to coping with social needs for achieving an enhanced efficiency and downsizing with an eye to the future, the level of voltage drop in ON state of the voltage-driven type element will be an obstacle as long as holding over the technique using the current voltage-driven switching transistor. In particular, observing the current situation, the voltage drop in ON state of the IGBT et al. being a mainstream voltage-driven switching transistor has already been improved closely up to the theoretical value. All the more because of its current high percentage of completion, it cannot be expected to reduce the conduction loss drastically.

As to switching loss, loss recovery techniques utilizing resonance phenomenon and soft switching techniques have been developed for preventing electromagnetic environment pollution and reducing power loss. In contrast, a conduction loss in transistors serving as a switching element inevitably arises when a current is passed through the element and the level of the loss depends on the performance of the element. Thus, the conduction loss cannot be readily reduced only by a simple modification but a radical review of circuit topology.

In the technical field of the power conversion apparatus, various efforts are currently continued to achieve further downsized apparatus as a whole, higher power density, and higher efficiency et al.

Two primary losses arise in the semiconductor switching transistor of the power conversion apparatus; one is a switching loss arising in the course of changing the transistor from ON state to OFF state or from OFF state to ON state; and the other is a conduction loss caused by a voltage drop arising in the transistor when this transistor is in ON state. Thus, in order to provide a power conversion apparatus capable of meeting the need in response to the demand for further downsizing the current power conversion apparatus and enhancing its power density, it is necessary to develop a technique capable of achieving higher efficiency by comprehensively reducing both of the conduction loss caused by the voltage drop in ON state of the switching transistor and the switching loss which lead to a power loss.

Heretofore, there have been very few cases reporting that the conduction loss in the switching transistor was reduced by an effective improvement in circuit. Giving some examples from among such few cases, Japanese Patent Laid-Open Publication No. Hei 1-97173 discloses a technology for reducing both a switching loss and conduction loss in a PWM full-bridge power conversion apparatus, such as a PWM inverter, by applying a semiconductor switching element having a small conduction loss, such as a bipolar transistor, to an arm switched by commercial frequency, and a semiconductor switching element having a small switching loss, such as a static-induction transistor (SIT), to an arm switched by high-frequency, so as to make up a bridge circuit in the apparatus. The Journal of the Institute of Electrical Engineers of Japan, Section D, vol. 116, No. 12, 1996, pp. 1205–1210, also discloses a modification in circuit for reducing a conduction loss in a power conversion apparatus using semiconductor switching elements. However, these prior arts involve problems, such as an actual restriction of their driving frequency, due to insufficient studies in terms of optimization of the conduction loss, reduction of the loss in their driving circuit, downsizing et al. For example, the aforementioned Japanese Patent Laid-Open Publication includes no specific teaching about how to drive the bipolar transistor serving as a current control switching element. However, when a constant current is applied to a base of the transistor as in conventional methods for driving transistors, the efficiency in low load will be particularly deteriorated due to the driving loss in no load state or low load state. In the technique described in the aforementioned Journal of the Institute of electrical Engineers of Japan, two transistors each having a small conduction loss are selectively used among the switching transistors to couple with each other in the form of the Darlington-connection, and its initial-stage transistor serves as a driving transistor. Further, an auxiliary power source composed of a current transformer (CT) is interposed between the driving transistor and the other or main transistor. This disclosure describes that this circuitry may reduce the conduction loss to one-third. However, in the circuit described in this disclosure, it is necessary for the couple of Darlington-connected transistors to have a high withstand voltage characteristic. Generally, as a withstand voltage of a semiconductor switching element is increased, the element has an increased voltage drop and a lowered switching speed. Thus, this technique has its limits in achieving an improved efficiency and enhanced driving frequency.

DISCLOSURE OF THE INVENTION

In view of the aforementioned problems in the prior arts, it is an object of the present invention to provide a switching circuit for a power conversion apparatus capable of reducing conduction loss to provide a higher efficiency, and achieving downsizing and weight-reduction and higher driving frequency based on the improved efficiency.

In order to achieve the aforementioned object, in a switching circuit for a power conversion apparatus according to the present invention, a driving transistor is connected to a switching main transistor to supply a driving power for ON-OFF driving thereto, and an auxiliary power source composed of a current transformer is provided between the main transistor and the driving transistor. Further, an auxiliary transistor having a lower switching loss than that of the main transistor is connected in parallel with the main transistor to form a main switch in combination with the main transistor. In the present invention, a current-driven type transistor serves as the main transistor, and voltage-driven type transistors serve as both of the driving transistor and the auxiliary transistor. The auxiliary transistor is adapted to be driven at a higher speed timing than that of the main transistor when the main transistor is turned on, and adapted to be driven at a lower speed than that of the main transistor when the main transistor is turned off.

In a preferred embodiment of the present invention, the main transistor is adapted to have a period of OFF state in the state when a driving control signal is transmitted only to the auxiliary transistor to bring the auxiliary transistor into ON state. In this case, a regenerative diode is preferably provided to regenerate power from an output of the main switch to the auxiliary power source in the period when the driving control signal is transmitted only to the auxiliary transistor. In another embodiment of the present invention, the auxiliary transistor may be adapted to be driven only during an activation period of the main switch. Further, in another embodiment of the present invention, an activating power source may be provided for supplying an activating power to the auxiliary power source only during the activation period of the main switch.

In another aspect of the present invention, there is provided a switching circuit for a power conversion apparatus, wherein a driving transistor is connected to a switching main transistor to supply a driving power for ON-OFF driving thereto, and an auxiliary power source composed of a current transformer is provided between the main transistor and the driving transistor, so as to supply a power from the auxiliary power source to the driving transistor through a rectifier circuit. In this case, a current-driven type transistor serves as the main transistor, and voltage-driven type transistors serves as the driving transistor. An activating device is also provided for applying a bias power to the auxiliary power source in an earlier timing than that of an activation of the main transistor when the main transistor is turn on.

BRIEF DESCRIPTION OF THE DRAWINGS

FIGS. 3(a) and (b) is a diagram showing a switching timing in the power conversion apparatus of FIG. 2;

BEST MODE OF CARRING OUT THE INVENTION

With reference to the drawings, embodiments of the present invention will now be described. Firstly, referring to FIG. 1, a switching circuit implementing the present invention includes a main transistor S1 composed of a current-driven type semiconductor switching element, and a driving transistor S2 connected to a base of the main transistor S1 to apply a driving signal to the base the main transistor S1. As one feature of the present invention, the driving transistor is composed of a voltage-driven type semiconductor element. An auxiliary transistor S3 is connected in parallel with the main transistor S1. This auxiliary transistor S3 is also composed of a voltage-driven type semiconductor element. A drain of the auxiliary transistor S3 is connected to a collector of the main transistor S1, and a source of the auxiliary transistor S3 is connected to an emitter of the main transistor S1. The main transistor S1 and auxiliary transistor S3 make up a main switch MS.

Figure 1:
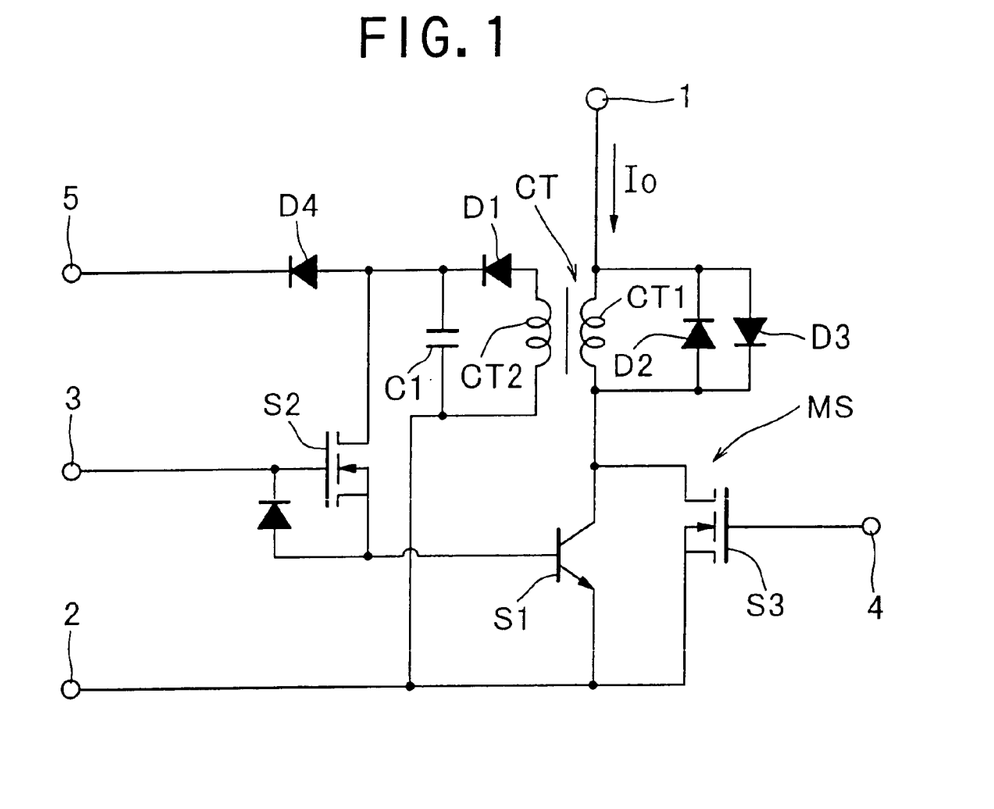
FIG. 1 is a circuit diagram of a switching circuit showing one embodiment of the present invention.

The collector of the main switch S1 is connected to one electrode of a DC power source through a connecting terminal 1, and the emitter of the main transistor S1 is connected to the other electrode of the DC power source through a connecting terminal 2. The main switch MS and the driving transistor S2 are connected to the connecting terminal 1 through a current transformer CT. A primary winging CT1 of the current transformer CT is connected in series with the main transistor S1, and a secondary winging CT2 of the current transformer CT is connected to the driving transistor S2 through a rectifier circuit composed of a diode D1 and a capacitor C1. Each diode D2, D3 is connected in parallel with the primary winding CT1 of the current transformer CT. Specifically, a drain of the driving transistor S2 is connected to the secondary winding of the current transformer CT, and a source of the driving transistor S2 is connected to the base of the main transistor S1.

In this switching circuit, terminals 3 and 4 are provided for receiving input signals applied to respective gates of the driving transistor S2 and the auxiliary transistor S3, respectively. An operation of the current transformer is the same as that described in the aforementioned disclosure of the Journal of the Institute of Electrical Engineers of Japan. Specifically, a driving current corresponding to an input current of the main switch is supplied to the base of the main transistor S1 through the driving transistor S2. In the illustrated switching circuit, since one end of the secondary winding of the current transformer CT is connected to the drain of the driving transistor S2 and the other end of the secondary winding is connected to the emitter of the main transistor S1, a withstand voltage required to the driving transistor S2 becomes lower than that of the main transistor S1. Thus, a relatively inexpensive transistor having a low withstand voltage characteristic, a fast switching speed, and a low voltage drop may be used as the driving transistor S2. Since the driving transistor S2 for supplying the driving current to the main transistor S1 is composed of a voltage-driven type of transistor, the driving transistor S2 may be driven by a suitable control signal having power saving effect.

Figure 2:
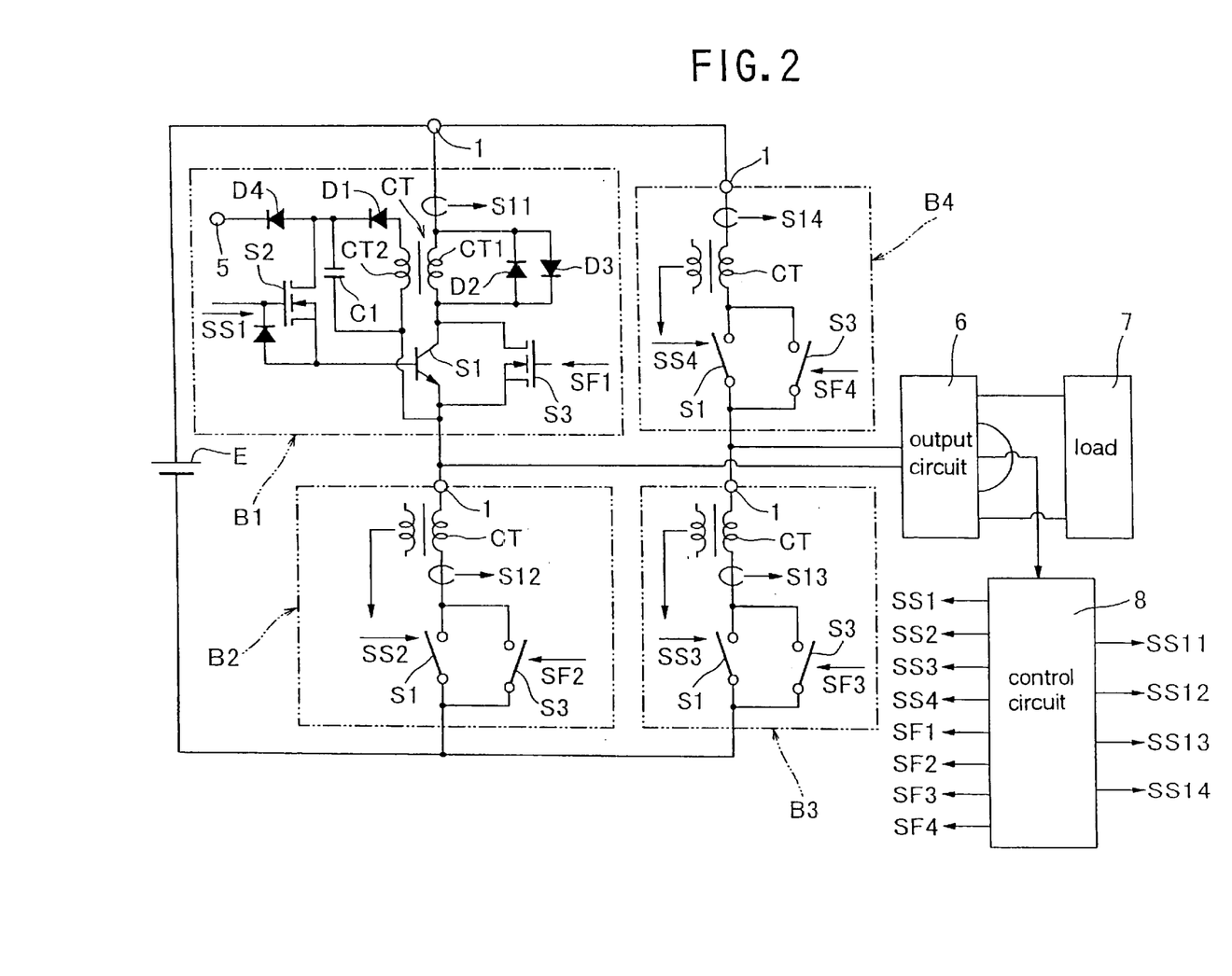
FIG. 2 is a circuit diagram showing a structure of a power conversion apparatus using the switching circuit of FIG. 1.

FIG. 2 shows one example of a power conversion apparatus using the switching circuit shown in FIG. 1. This power conversion apparatus includes four switching circuits having the structure shown in FIG. 1, and the reference numbers B1, B2, B3, B4 indicates each switching circuit. In FIG. 2, while circuit elements and their connection are shown for the switching circuit B1 as with FIG. 1, such detail has been omitted for other switching circuits B2, B3, B4.

In FIG. 2, terminals 1 of the switching circuits B1, B4 are connected to a positive electrode of a DC power source E, and each emitter of main transistors S1 of the switching circuits B2, B3 are connected to a negative electrode of the DC power supply E. Emitters of main transistors S1 of the switching circuit B1, B4 and terminals 1 of the switching circuit B2, B3 are connected to an output circuit 6, and the output circuit 6 is connected to a load 7. A signal corresponding to an output is input to a control circuit 8. Signals S11, S12, S13, S14 indicating respective currents flowing through main transistors S1 of the switching circuits B1, B2, B3, B4 are input to the control circuit 8. The control circuit 8 generates a switching signal by receiving these input signals. The switching signal includes main transistor driving signals SS1, SS2, SS3, SS4 to be applied to respective driving transistors S2 of the switching circuits B1, B2, B3, B4, and auxiliary transistor driving signals SF1, SF2, SF3, SF4 to be applied to respective auxiliary transistors S3 of the switching circuits B1, B2, B3, B4.

Figure 3:
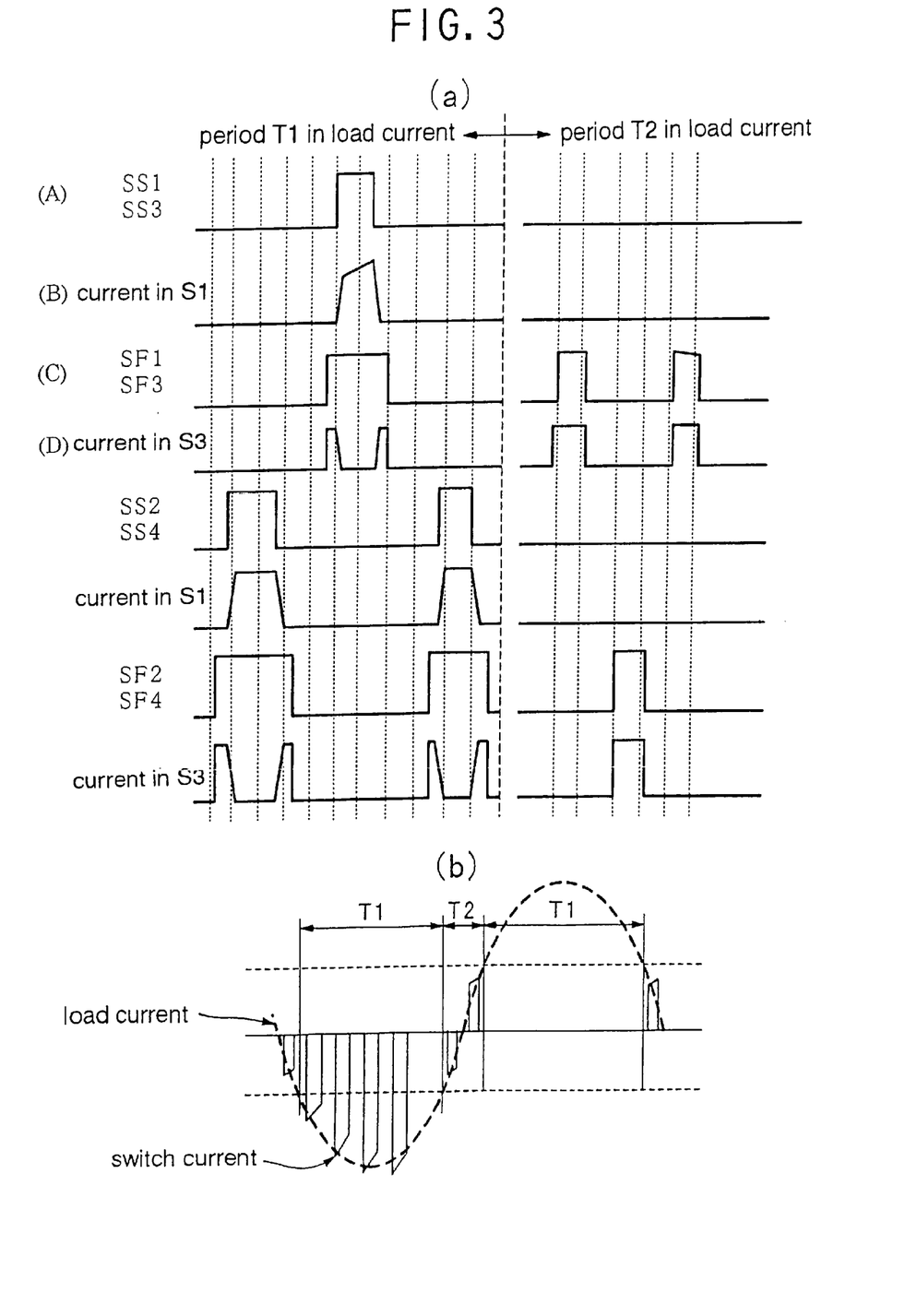

FIG. 3(a) is a time chart showing an operation timing of each switching transistor in the power conversion apparatus shown in FIG. 2. For setting the operation timing of each switching transistor, a half cycle of an AC output is divided into two sections, and different timings are set in each section. In the waveforms of the AC output shown in FIG. 3(b), the half cycle comprises a period T1 in which an output current is higher than a given rate to a peak value of the output current, and a period T2 in which the output current is lower than the given rate to the peak value.

As sown in FIG. 3(a), in the period T1, the driving signals SS1, SS3 indicated by (A) in FIG. 3(a) are applied to the driving transistors S2 of the switching circuits B1, B3, respectively, and thereby a current indicated by (B) in FIG. 3(a) flows through each of the switching circuits B1, B3. The driving signals SF1, SF3 indicated by (C) in FIG. 3(a) are also applied to the auxiliary transistors S3 of the switching circuits B1, B3, respectively, and thereby a current indicated by (D) in FIG. 3(a) flows through each of the switching circuits B1, B3. As is apparent from FIG. 3(a), the driving signal applied to the auxiliary transistors S3 is initiated in an earlier timing than that of the driving signal applied to the driving transistors S2, and it is held on after the driving signal of the driving transistors S2 is turned off. While the current of the auxiliary transistors S3 flows until the current of the main transistor S1 raises up, the current of the auxiliary transistors S3 gradually decreases after the current starts flowing through the main transistor S1 and becomes zero during the current equivalent to the output current flows through the main transistor S1. This arises because the current-driven type main transistor S1 has a lower resistance to the current flow, and thereby the current flows toward the main transistor.

According to the above control, when the main switch MS is turn on, the rectifier circuit provided on the side of the secondary winding of the current transformer CT serving as an auxiliary power source is activated, and thereby the auxiliary power source may function without any delay upon the turn-on of the main switch. Further, when the main switch MS is turn off, the switching operation arising a switching loss is carried out by the element having a faster switching speed than that of the main transistor S1. This allows the switching loss to be reduced. Further, since the current-driven type transistor having a low conduction loss is conducted during the most part of a period in which the main switch is conducted, the conduction loss may also be reduced. Thus, the loss of the switching circuit may be reduced as a whole.

In this circuit, the auxiliary transistor S3 may be controllably operated only during the activation period of the main switch MS. The term "the activation period of the main switch MS" herein means a period of an initial operation in which the initially activated main switch MS enters into a regular operation state. For this control, the driving signal is supplied to the auxiliary transistor S3 in response to a charging voltage of the capacitor C1 of the rectifier circuit connected to the secondary winding CT2 of the current transformer CT More specifically, during the activation period of the main switch, the driving signal is applied to the gate of the auxiliary transistor S3 until a given electric charge is accumulated in the capacitor C1. Then, after the given electric charge has been accumulated in the capacitor C1, the driving signal of the auxiliary transistor is stopped. After the given electric charge has been accumulated in the capacitor C1, the power from the auxiliary power source is applied to the driving transistor S2 to activate the regular switching operation of the main switch MS. In this control, the auxiliary transistor S3 is operated only in the initial operation of the main switch. This allows a component having a low capacity to be used as the auxiliary transistor S3. Further, the operation of the main switch MS is controlled only by the action of main transistor S1 during a period other than the activation period of the main switch. Thus, the operating, or driving, frequency of the main switch depends on the characteristic of the main transistor.

As shown in FIG. 3(a), the operating timings of the switching circuits B2, B4 are shifted by a half cycle with respect to those of the switching circuit B1, B3.

Figure 4:
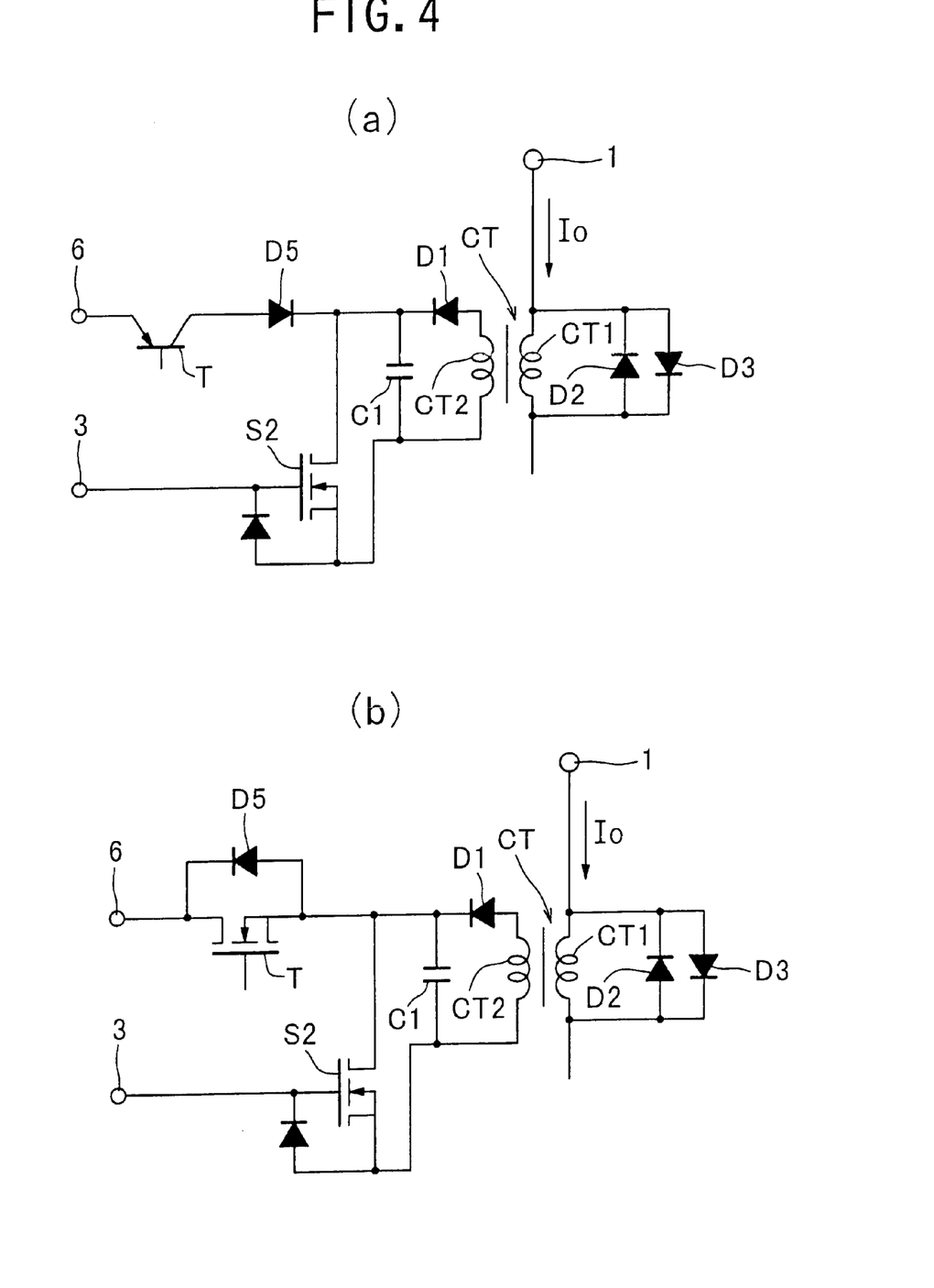
FIG. 4(a) is a circuit diagram showing an arrangement of an activating power supply transistor.
FIG. 4(b) is a circuit diagram showing another arrangement of an activating power supply transistor.

In the period T2 in which the output current becomes lower than the given rate of the peak value of the output current, the driving signals SS1, SS3 for the driving transistors S2 is stopped, and the switching operation is carried out only by the activation of the auxiliary transistor S3, as shown in FIG. 3(a). In this case, the accumulated energy in the secondary winding CT2 of the transformer CT serving as the auxiliary power source may be regenerated from a terminal 5 having a diode D4 shown in FIGS. 1 and 2, and this regenerated energy may, for example, be supplied to the auxiliary power supply of any other switching circuit. In order to achieve this operation, as shown in FIG. 4, a bias transistor T is connected to the circuit connected to the secondary winding CT2 of the current transformer CT to supply an activating power through an anti-reverse-voltage diode D4, for example. Then, the regenerated energy at any other switching circuit may be supplied this switching circuit during the activation period of the main switch.

Figure 5:
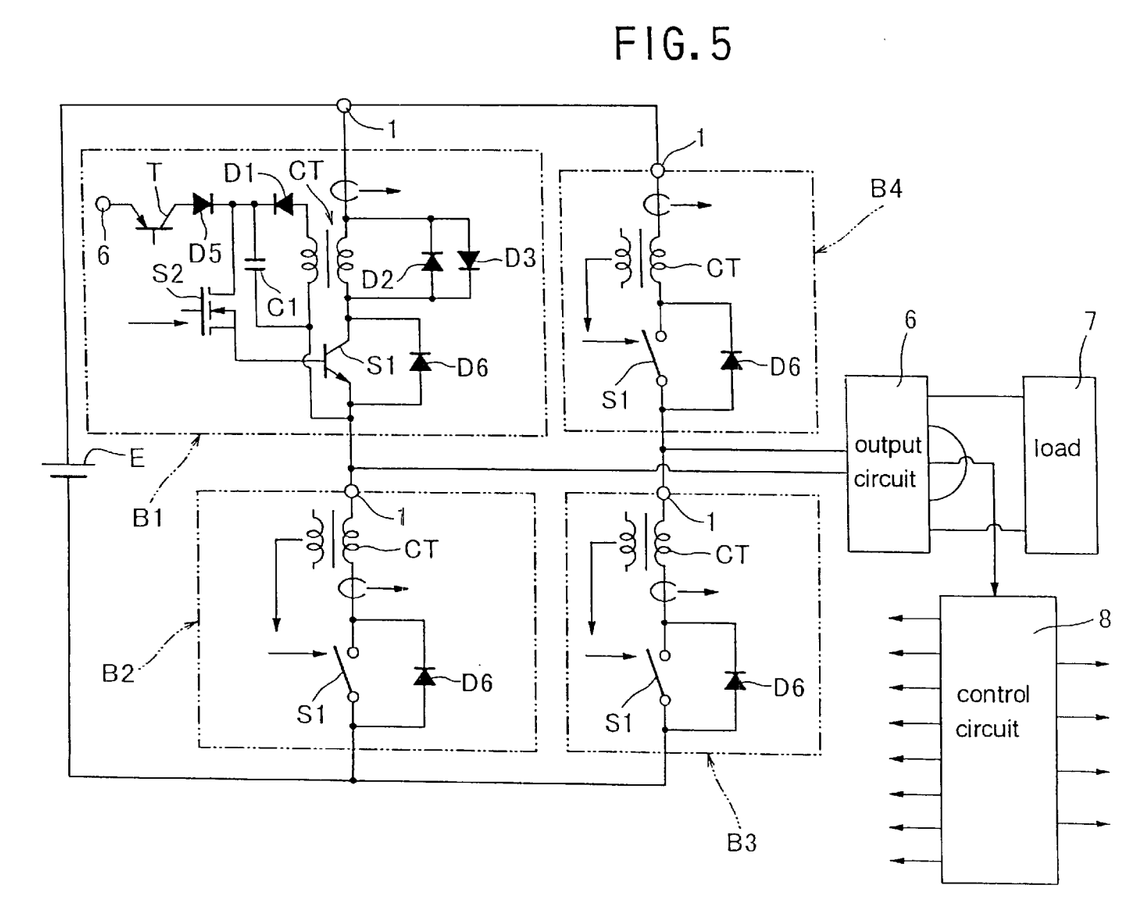
FIG. 5 is a circuit diagram showing an example of power conversion apparatus using a switching circuit provided with the activating power supply transistor.

Further, a circuit including the transistor T shown in FIG. 4(a) is useful for an activating circuit of the main switch. Specifically, during the activation period of the main switch MS, the activating power may be supplied from the transistor T to the main switch, and after the activation period, the transistor T may be controllably turn off. This activation process is advantageous to allow the main switch to be activated with a lower voltage. Thus, the auxiliary transistor S3 in FIG. 1 may be omitted and the anti-reverse-voltage diode may be alternatively used. Furthermore, a circuit including the transistor T shown in FIG. 4(a) is also useful for an activating circuit of the main switch. Specifically, during the activation period of the main switch MS, the activating power may be supplied from the transistor T to the main switch, and after the activation period, the transistor T may be controllably turn off. This activation process is advantageous to allow the main switch to be activated with a lower voltage. Thus, the auxiliary transistor S3 in FIG. 1 may be omitted and the anti-reverse-voltage diode may be alternatively used. FIG. 5 shows one example of a power conversion apparatus using a switching circuit constructed as describe above. In FIG. 5, a diode connected in parallel with the main transistor S1 is designated by the reference number D6.

What is claimed is:

1. A switching circuit for a power conversion apparatus, wherein a driving transistor is connected to a switching main transistor to supply a driving power for ON-OFF driving thereto, an auxiliary power source composed of a current transformer being provided between said main transistor and said driving transistor, an auxiliary transistor having a lower switching loss than that of said main transistor being connected in parallel with said main transistor to form a main switch in combination with said main transistor, said switching circuit comprising;

a current-driven type transistor serving as said main transistor, and voltage-driven type transistors serving as both of said driving transistor and said auxiliary transistor, wherein said auxiliary transistor is adapted to be driven at a higher speed than that of said main transistor when said main transistor is turned on, and adapted to be driven at a lower speed than that of said main transistor when said main transistor is turned off.

2. A switching circuit as defined in claim 1, wherein said main transistor is adapted to have a period of OFF state within a half cycle of an AC output of said power transformer apparatus in the state when a driving control signal is transmitted only to said auxiliary transistor to bring said auxiliary transistor into ON state.

3. A switching circuit as defined in claim 2, which further includes a regenerative diode for regenerating power from an output of said main switch to said auxiliary power source in said period when said driving control signal is transmitted only to said auxiliary transistor.

4. A switching circuit as defined in claim 1, wherein said auxiliary transistor is adapted to be driven only during an activation period of said main switch.

5. A switching circuit as defined in claim 1, which further includes an activating power source for supplying an activating power to said auxiliary power source only during said activation period of said main switch.

6. A switching circuit for a power conversion apparatus, wherein a driving transistor is connected to a switching main transistor to supply a driving power for ON-OFF driving thereto, and an auxiliary power source composed of a current transformer is provided between said main transistor and said driving transistor, so as to supply a power from said auxiliary power source to said driving transistor through a rectifier circuit, said switching circuit comprising:

a current-driven type transistor serving as said main transistor, and a voltage-driven type transistor serving as said driving transistor, and an activating device for applying a bias power to said auxiliary power source in an earlier timing than that of an activation of said main transistor when said main transistor is turn on.

* * * * *

UNITED STATES PATENT AND TRADEMARK OFFICE
CERTIFICATE OF CORRECTION

PATENT NO. : 6,353,543 B2
DATED : March 5, 2002
INVENTOR(S) : Kazuyuki Itoh et al.

It is certified that error appears in the above-identified patent and that said Letters Patent is hereby corrected as shown below:

<u>Title page,</u>
Item [56], References Cited, under "FOREIGN PATENT DOCUMENTS", insert:
-- 4-265661 09/1992 JAPAN
 5-90933 04/1993 JAPAN
 6-311744 11/1994 JAPAN --.

Signed and Sealed this

Thirteenth Day of August, 2002

*Attest:*

JAMES E. ROGAN
*Director of the United States Patent and Trademark Office*

*Attesting Officer*